US008560302B2

(12) United States Patent
Gao et al.

(10) Patent No.: US 8,560,302 B2
(45) Date of Patent: Oct. 15, 2013

(54) METHOD AND SYSTEM FOR GENERATING DERIVATIVE WORDS

(75) Inventors: Jinglian Gao, Guangzhou (CN); Binghui Chen, Guangzhou (CN)

(73) Assignee: Guangdong Guobi Technology Co. Ltd, Guangzhou (CN)

( * ) Notice: Subject to any disclaimer, the term of this patent is extended or adjusted under 35 U.S.C. 154(b) by 273 days.

(21) Appl. No.: 13/127,986

(22) PCT Filed: Feb. 25, 2009

(86) PCT No.: PCT/CN2009/000202
§ 371 (c)(1),
(2), (4) Date: May 6, 2011

(87) PCT Pub. No.: WO2010/051674
PCT Pub. Date: May 14, 2010

(65) Prior Publication Data
US 2011/0208512 A1 Aug. 25, 2011

(30) Foreign Application Priority Data
Nov. 7, 2008 (CN) .......................... 2008 1 0218948

(51) Int. Cl.
*G06F 17/27* (2006.01)
*G06F 17/20* (2006.01)
(52) U.S. Cl.
USPC .............................................. 704/9; 715/261
(58) Field of Classification Search
None
See application file for complete search history.

(56) References Cited

U.S. PATENT DOCUMENTS

| 4,754,474 | A | * | 6/1988 | Feinson | 379/93.18 |
|---|---|---|---|---|---|
| 5,210,689 | A | * | 5/1993 | Baker et al. | 704/1 |
| 5,828,991 | A | * | 10/1998 | Skiena et al. | 704/9 |
| 6,307,548 | B1 | * | 10/2001 | Flinchem et al. | 715/811 |
| 6,636,162 | B1 | * | 10/2003 | Kushler et al. | 341/28 |
| 7,277,029 | B2 | * | 10/2007 | Thiesson et al. | 341/22 |
| 7,395,512 | B2 | * | 7/2008 | Makabe et al. | 715/816 |
| 7,453,439 | B1 | * | 11/2008 | Kushler et al. | 345/168 |
| 7,583,205 | B2 | * | 9/2009 | Fux et al. | 341/22 |
| 7,809,553 | B2 | * | 10/2010 | Fux et al. | 704/10 |
| 2004/0095327 | A1 | * | 5/2004 | Lo | 345/169 |
| 2007/0094024 | A1 | * | 4/2007 | Kristensson et al. | 704/252 |
| 2008/0208566 | A1 | * | 8/2008 | Alonichau | 704/9 |
| 2011/0234524 | A1 | * | 9/2011 | Longe et al. | 345/173 |

\* cited by examiner

*Primary Examiner* — Brian Albertalli
(74) *Attorney, Agent, or Firm* — George D. Liu; Ronda IP Agent Co. Ltd

(57) ABSTRACT

The present invention provides a method for generating derivative words including the steps of: creating a number of derivative grammar arrays; matching the inputting character information with the derivative grammar arrays and obtaining the match derivative grammar arrays; obtaining match words from the language database according to the condition arrays of the obtained derivative grammar arrays and the inputting character information; and generating derivative words by adding the suffix alphabetic character sets of the obtained derivative grammar arrays to the ends of the words. In accordance with the established grammar rules, the words in the language database can be converted to derivative words and the derivative words do not need to be stored in the language database. Therefore, the storage space of the language database can be remarkably reduced. The present invention also provides a system for generating derivative words.

3 Claims, 9 Drawing Sheets

METHOD AND SYSTEM FOR GENERATING DERIVATIVE WORDS

CROSS-REFERENCE TO RELATED APPLICATIONS

The present invention claims priority to Chinese Patent Application No. CN 200810218948.9 filed Nov. 7, 2008, which is incorporated by reference herein in its entirety.

FIELD OF THE INVENTION

The present invention relates to word input technologies for use in electronic devices and, more specifically, to a method and system for generating derivative words.

BACKGROUND OF THE INVENTION

At present, most embedded devices, such as mobile phones, PDAs (personal digital assistant), set-top boxes, are installed with a word input software configuring with a language database. For users, it is desirable that the language database include all possible words of a language. However, the storage space of an embedded device is always too small to store enough words of the language, the language database can only store commonly used words.

As it is well known in the art, languages in Latin language family, such as, English and German, etc., contains a lot of derived words generated by adding some suffixes in accordance with grammar rules. The storage of derived words requires a larger language database. But if we store suffixes instead of derived words, the utilization of the language database can be greatly improved.

Therefore, what is urgently needed now is to provide a method and system for generating derivative words which can improve the effective utilization of the limit storage space of the language database.

SUMMARY OF THE INVENTION

One object of the present invention is to provide a method for generating derivative words which can reduce the storage space of the language database.

In accordance with one embodiment of the present invention, a method for generating derivative words includes the steps of: 1) creating a plurality of derivative grammar rule arrays, each of which comprising a suffix alphabetic character set and a condition array whose condition the base words have to meet, said condition array having a part of speech of the base words as required by corresponding suffix alphabetic character set; 2) inputting a user character set; 3) matching the user character set with each derivative grammar rule array, then obtaining the derivative grammar rule array which matches with the user character set; 4) obtaining a word meeting the requirement of the condition arrays of the obtained derivative grammar rule arrays, from a language database in accordance with the user character set; generating a derivative word via adding the suffix alphabetic character sets to the obtained words, the alphabetic character sets being included in the derivative grammar rule arrays which include the condition arrays as met by the obtained words.

In accordance with one embodiment of the method of the present invention, the derivative grammar rule arrays further comprise suffix key character sets corresponding to the suffix alphabetic character sets according to the function definition of the keys; the user character net is a user key character set; and in said step 3), the user key character set is compared with the suffix key character set of derivative grammar rule array, if the end of the user key character set comprises all or part of the key character of the suffix key character set, the derivative grammar rule array having the suffix key character set is obtained.

In accordance with one embodiment of the method of the present invention, the derivative grammar rule arrays further comprise suffix key character sets corresponding to the suffix alphabetic character sets according to the function definition of the keys; the user character set is a user key character set; the method further comprises the step of converting the user key character set to a user alphabetic character set according to the function definition of the keys; and in said step 3), the user alphabetic character set is compared with the suffix alphabetic character set of each of the derivative grammar arrays, if the end of the user alphabetic character set comprises all or part of the alphabetic character of the suffix alphabetic character set, the derivative grammar rule array having the suffix alphabetic character set is obtained.

In accordance with one embodiment of the method of the present invention, the user character set is a user alphabetic character set and, in said step 3), the user alphabetic character set is compared with the suffix alphabetic character set of each of the derivative grammar arrays, if the end of the user alphabetic character set comprises all or part of the alphabetic character of the suffix alphabetic character set, the derivative grammar rule array having the suffix alphabetic character set is obtained.

In accordance with one embodiment of the method of the present invention, the comparison is carried out character by character in an order from back to front.

In accordance with one embodiment of the method of the present invention, the user character set is a user key character set; and said step 4) further comprises steps of: obtaining words matching the user key character set from the language database; and comparing the part of speech of each of the obtained words with that in each array of derivative grammar rules, and obtaining all of the words having same part of speeches to any one of the part of derivative grammar arrays.

In accordance with one embodiment of the method of the present invention, the user character set is a user key character set, the user key character set is converted to a user alphabetic character set according to the function definition of the keys; and said step 4) further comprises the steps of: obtaining words matching the user alphabetic character set from the language database; comparing the part of speech of each obtained word with that of each of derivative grammar rule arrays, then obtaining all of the words having same part of speeches.

In accordance with one embodiment of the method of the present invention, the user character set is a user alphabetic character set; and said step 4) further comprises the steps of: obtaining words matching the user alphabetic character set from the language database; comparing the part of speech of each obtained word with that in each of derivative grammar rule arrays, then obtaining all of the words having same part of speeches.

In accordance with one embodiment of the method of the present invention, the condition array further comprises a second alphabetic character set of the end of the base word as required by corresponding suffix alphabetic character set according to the grammar rules.

According to one embodiment of the method of the present invention, each of the derivative grammar arrays further comprises a first alphabetic character set which should be deleted from the ends of the base words as required by corresponding suffix alphabetic character set according to the grammar rules when the derivative words are generated, said step 4 further comprises a step of judging whether the end of one of the obtained words have the first alphabetic character set in each of the obtained derivative grammar arrays, if the judge result is yes, the first alphabetic character set at the end of the word is deleted, and the suffix alphabetic character set of the derivative grammar rule array is added to the end of the remainder so as to generate a derivative word; if the judge result is no, the suffix alphabetic character set of the derivative grammar rule array is added to the end of the word to generate a derivative word.

The other object of the present invention is to provide a system for generating derivative words which can reduce storage space of the language database.

In accordance with one embodiment of the present invention, the system comprises: an input device used for inputting user character sets; a storage for storing a plurality of derivative grammar arrays, a plurality of derivative grammar arrays are stored in the storage, each derivative grammar rule array comprising a suffix alphabetic character set and a condition array corresponding to the base words, the condition array comprising a part of speech corresponding to that of the base word as required by the suffix alphabetic character set; a first match processing module, used for matching the user character set with each of derivative grammar rule arrays, and obtaining the derivative grammar arrays matching the character information; a second match processing module, used to obtain words from the language database in accordance with the user character set, the obtained words meeting the requirement of the condition array in one of the derivative grammar arrays as obtained in the first match processing module; a derivative processing module, used for adding suffix alphabetic character sets behind the obtained words to generate derivative words, the suffix alphabetic character sets being taken from the derivative grammar arrays having the condition arrays met by the words; and a language database, used for storing words.

According to one embodiment of the system of the present invention, the derivative grammar arrays further comprises suffix key character sets corresponding to the suffix alphabetic character sets in accordance with the function definition of the keys; the input device is a key input device, and the inputting character information is a user key character set; and the first match processing module compares the user key character set with the suffix key character set of each array of derivative grammar rules, if the end of the user key character set comprises all or part of the suffix key character set, the first match processing module obtains the derivative grammar rule array having the suffix key character set.

According to one embodiment of the system of the present invention, the system further comprises a converting processing module, used for converting the user key character sets to user alphabetic character sets according to the function definition of the keys; the input device is a key input device, the inputting character information is a user key character set; the first match processing module compares the user alphabetic character set with the suffix alphabetic character set of each of derivative grammar rule arrays, if the end of the user alphabetic character set comprises all or part of the suffix alphabetic character set, the first match processing module obtains the derivative grammar rule array having the suffix alphabetic character set.

According to one embodiment of the system of the present invention, the input device is a handwritten input device, the inputting character information is a user alphabetic character set; and the first match processing module compares the user alphabetic character set with the suffix alphabetic character set of each derivative grammar rule array, if the end of the user alphabetic character set comprises all or part of the suffix alphabetic character set, the first match processing module obtains the derivative grammar rule array having the suffix alphabetic character set.

According to one embodiment of the system of the present invention, the comparison of the first match processing module is carried out character by character in an order from back to front.

According to one embodiment of the system of the present invention, the input device is a key input device, the inputting character information is a user key character set; and the second match processing module further comprises: a word searching processing module, used for obtaining words matching the user key character set inputted by the key input device from the language database; and a first comparing processing module, used for comparing the part of speech of each of the words obtained by the searching processing module with that of each of the derivative grammar arrays obtained by the first match processing module, and obtaining all of the words having the same part of speeches.

According to one embodiment of the present invention, the system further comprises a converting processing module used for converting the user key character sets to user alphabetic character sets according to the function definition of the keys; the input device is a key input device, and the inputting character information is a user key character set; and the second match processing module further comprises: a word searching processing module, used for obtaining words matching the user alphabetic character set converted by the converting processing module from the language database; and a first comparing processing module, used for comparing the part of speech of each of the words obtained by the searching processing module with that of each of the derivative grammar arrays obtained by the first match processing module, and obtaining all of the words having same part of speeches.

According to one embodiment of the system of the present invention, the input device is a handwritten input device, the inputting character information is a user alphabetic character set, and the second match processing module further comprises: a word searching processing module, used for obtaining words matching the user alphabetic character set inputted by the handwritten input device from the language database; and a first comparing processing module, used for comparing the part of speech of each of the words obtained by the searching processing module with the part of speech in each of the derivative grammar arrays obtained by the first match processing module, and obtaining all of the words having same part of speeches.

According to one embodiment of the system of the present invention, the derivative grammar array further comprises a second alphabetic character set of the end of the base word as required by the suffix alphabetic character set according to the grammar rules.

According to one embodiment of the system of the present invention, each derivative grammar rule array comprises a first alphabetic character set which should be deleted from the ends of the base words according to the grammar rules when the derivative words are generated, as required by the corresponding suffix alphabetic character set; and the derivative processing module further comprises: a second comparing processing module, used for comparing the ends of words obtained by the second match processing module with the first alphabetic character sets of the derivative grammar array obtained by the first match processing module, if one of the words ends with any one of the first alphabetic character sets, delete the first alphabetic character set at the end of the word; and a generating processing module, used for adding the suffix alphabetic character sets of the derivative grammar arrays to the words which have been processed by the second comparing processing module to generate derivative words.

Compared with the prior art technologies, the present invention at least has the following advantages. The present invention creates a plurality of derivative grammar arrays, matches the inputting character information with the derivative grammar arrays, and obtains the match derivative grammar arrays. According to the condition arrays of the obtained derivative grammar arrays and the inputting character information, the present invention obtains match words from the language database. Then the derivative words are generated via adding the suffix alphabetic character sets of the obtained derivative grammar arrays to the ends of the words. In accordance with predetermined grammar rules, the words in the language database are converted to derivative words. Therefore, the derivative words do not need to be stored in the language database, and the storage space of the language database can be remarkably reduced.

The accompanying drawings, which are incorporated in and constitute a part of the present specification, illustrate embodiments of the invention and serve to explain the principles of the present invention. The advantages and the other aspects of the invention will be much clearer through the detailed description, in which:

DETAILED DESCRIPTION OF THE INVENTION

The present invention is applicable to all of the languages in Latin language family, including English, German, French, Turkish and so on, and mainly used in mobile phones, PDAs, set-top boxes and other electronic devices.

A method for generating derivative words in accordance with the present invention includes the steps of: 1) creating a plurality of derivative grammar rule arrays, each of which comprising a suffix alphabetic character set and a condition array whose condition the base words have to meet, said condition array having a part of speech of the base words as required by corresponding suffix alphabetic character set; 2) inputting a user character set; 3) matching the user character set with each derivative grammar rule array, then obtaining the derivative grammar rule array which matches with the user character set; 4) obtaining a word meeting the requirement of the condition arrays of the obtained derivative grammar rule arrays, from a language database in accordance with the user character set; generating a derivative word via adding the suffix alphabetic character sets to the obtained words, the alphabetic character sets being included in the derivative grammar rule arrays which include the condition arrays as met by the obtained words.

There are two ways to input the user character set. One way is to input a key character set by pressing the keys of a key input device. The key input device is a physical keyboard or a virtual keyboard. The other way is to input an alphabetic character set by writing on a handwritten input device. The two input manner can both be applied to the present invention.

Figure 8:
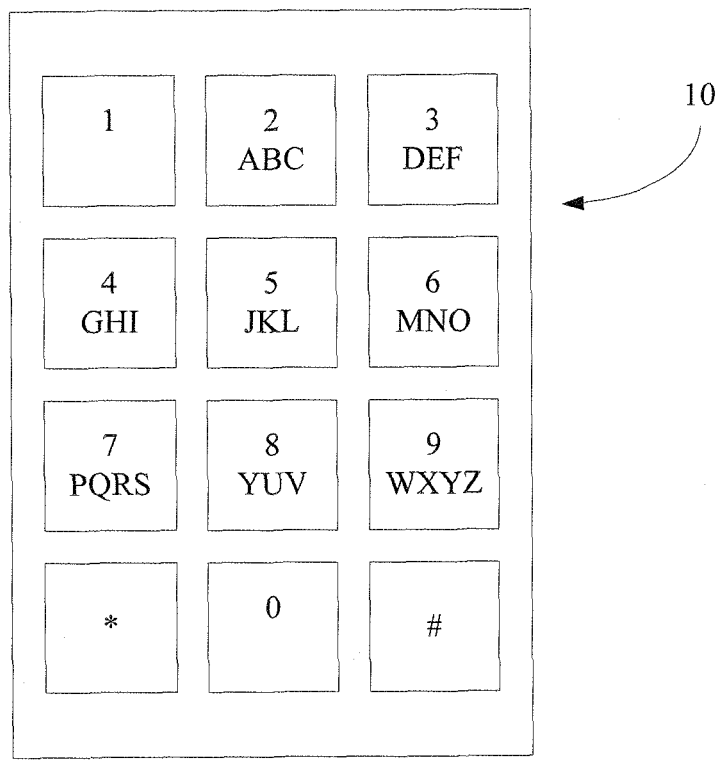
FIG. 8 is a schematic view of an input device for use in the system according to a preferred embodiment of the present invention.

The relations between the key character information and the alphabetic character information will now be described in detail with reference to the accompanying drawings. Referring to FIG. 8, the input device is a key input device, and more specifically, is a number keyboard. According to the function definition of the keys, the keys 2 to 9 are used for inputting alphabetic characters and Arabic characters, i.e. pressing any key means inputting a group of alphabetic character or an Arabic character. In the specification, each of the Arabic characters is written for representing the key character information which is defined on corresponding key. For instance, the number "2" are written for representing the corresponding key character. In accordance with the function definition of the keys, the key "2" corresponds to the alphabetic character "A", "B", and "C". The preferred embodiments of the present invention will now be described in detail by illustrating with reference to the accompanying drawings.

Figure 1:
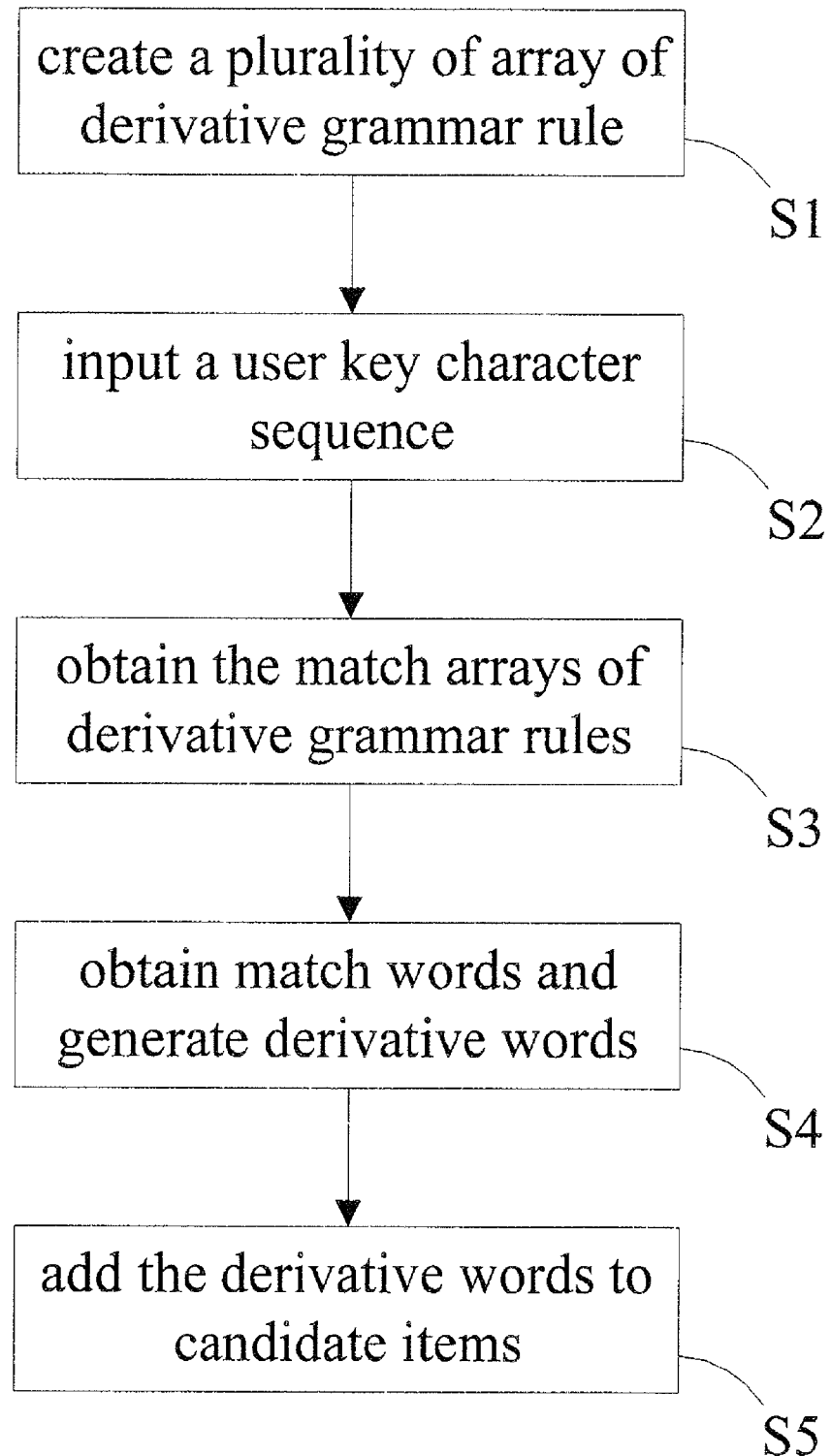
FIG. 1 is a flowchart of a method for generating derivative words according to a preferred embodiment of the present invention.

Referring to FIG. 1, a method for generating derivative words in accordance with a preferred embodiment of the present invention includes the following steps:

Step S1: creating a plurality of derivative grammar rule arrays according to the grammar rules, each of the derivative grammar rule arrays including a suffix alphabetic character set, a suffix key character set corresponding to the suffix alphabetic character set, a condition array and a first alphabetic character set. The condition array includes a part of speech of the base word required by the corresponding suffix alphabetic character and a second alphabetic character set.

The suffix key character set is a key character information sequence corresponding to the suffix alphabetic character set according to the function definition of the keys. Take the keyboard in FIG. 8 as an example, when the suffix alphabetic character set is "ing", the suffix key character set corresponding to the suffix alphabetic character set is "464". The part of speech in each derivative grammar rule array is a part of speech of the base words, which is required by the corresponding suffix alphabetic character set. For example, when the suffix alphabetic character set is "ing", the part of speech of the base words must be a verb.

The second alphabetic character set is one or more alphabetic character sets at the ends of the base words as required by the corresponding suffix alphabetic character set according to the grammar rules. For example, the English suffix alphabetic character set "es" requires that each of the corresponding base words has an alphabetic character set "x", "s", "ch" or "sh" at the ends. Therefore, in the condition array, the second alphabetic character set corresponding to the suffix alphabetic character set "es" is "x", "s", "ch" and "sh".

The first alphabetic character set is a alphabetic character set which will be deleted from the ends of the base words as required by the corresponding suffix alphabetic character set when the derivative words are generated according to the grammar rules. For example, in English, the suffix alphabetic character set "er" requires that the base words ended with alphabetic character set "e" delete the alphabetic character set "e" at their ends before adding the suffix alphabetic character set "er". Therefore, in the array of derivative grammar rule, the first alphabetic character set corresponding to the suffix alphabetic character set "er" is "e".

Step S2: inputting a user key character set.

Figure 2:
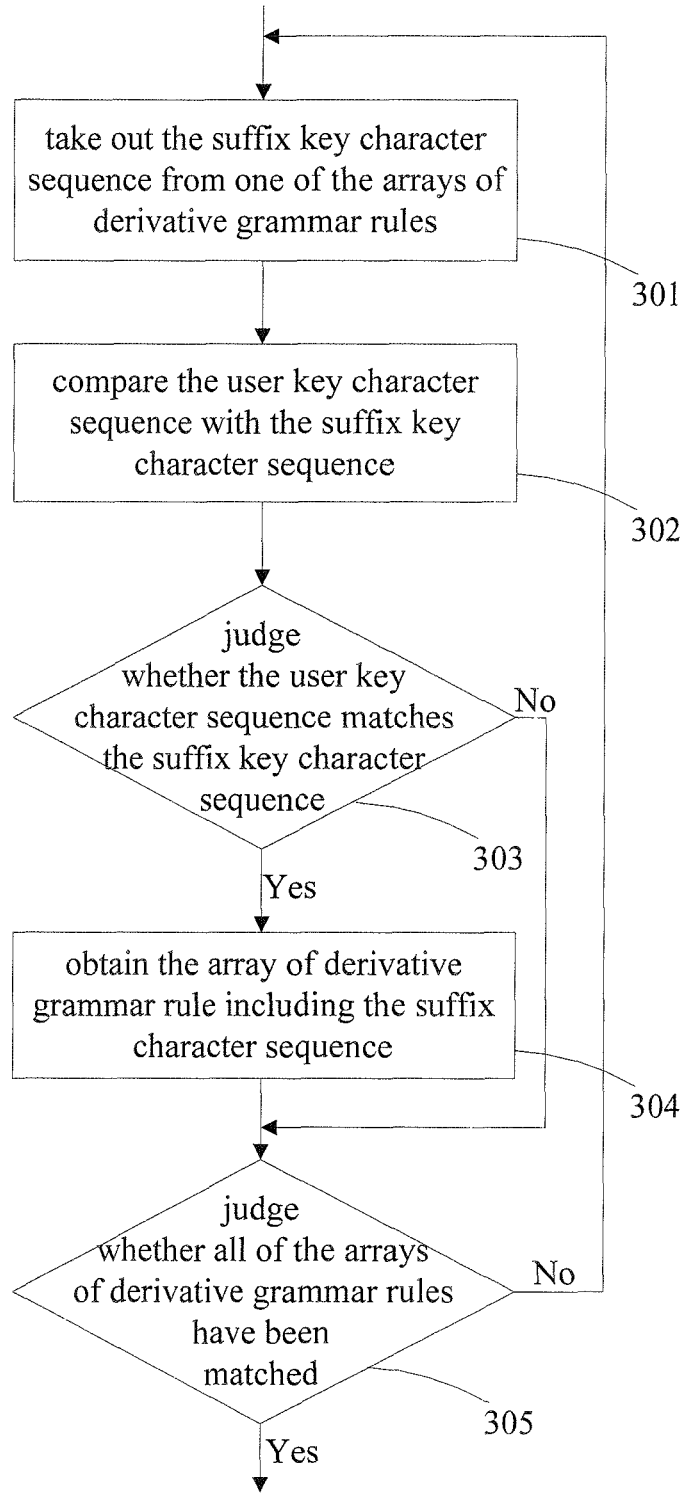
FIG. 2 is a flowchart of a preferred embodiment of step S3 as shown in FIG. 1.

Step S3: matching the user key character set with each of the derivative grammar rule arrays and obtaining the derivative grammar rule arrays matching the user key character set. Referring particularly to FIG. 2, step S3 further includes the following steps:

301: taking out an array from the derivative grammar rule arrays, and taking out the suffix key character set from the array of derivative grammar rule that have been taken out.

302: comparing the user key character set in step S2 with the suffix key character set which has been taken out in step 301 character by character in an order from back to front. If the user key character set includes all of the key characters of the suffix key character set in an order from the end of the user key character set to the front, the user key character set completely matches the suffix key character set. If the user key character set includes part of the key characters of the suffix key character set in an order from the end of the user key character set to the front, the user key character set matches the suffix key character set partly. Otherwise, the user key character set does not match the suffix key character set.

For example, when the user key character set is 9675464, and the suffix key character set is 464, the user key character set 9675464 is compared with the suffix key character set 464 in an order from back to front. Because the user key character set 9675464 includes all of the key characters of the suffix key character set 464 in sequence, therefore the user key character set 9675464 completely matches the suffix key character set 464.

For example, when the user key character set is 967546 and the suffix key character set is 464. The user key character set 967546 is compared with the suffix key character set 464 in an order from back to front. The user key character set 967546 includes the characters 46 in the suffix key character set 464, therefore the user key character set 967546 partly matches the suffix key character set 464.

303: judging whether the user key character set matches the suffix key character set in accordance with the comparison result in step 302. If the user key character set completely or partly matches the suffix key character set, turn to step 304. If the user key character set does not match the suffix key character set, turn to step 305.

304: obtaining the suffix key character set matching with the user key character set in step 303, and obtaining derivative grammar rule array including the suffix key character set.

305: judging whether the user key character set has been matched with the suffix key character sets of all the derivative grammar rule arrays. If the judge result is yes, turn to step S4. If the judge result is no, turn to step 301.

Figure 3:
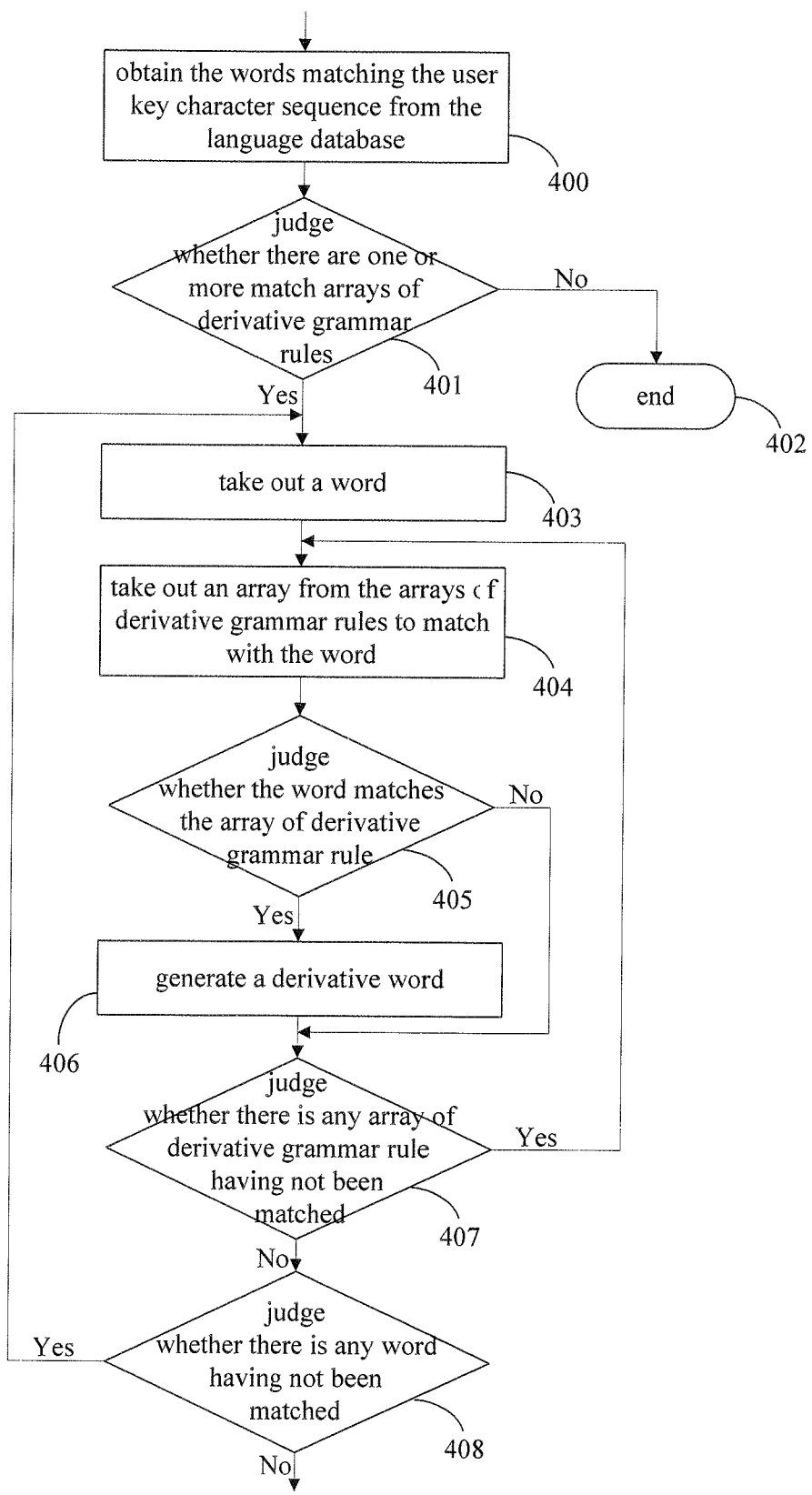
FIG. 3 is a flowchart of a preferred embodiment of step S4 as shown in FIG. 1.

Step S4: obtaining words meeting the requirement of the condition arrays in the obtained derivative grammar rule arrays from the language database according to the user key character set. Referring specifically to FIG. 3, step S4 further includes the following steps.

400: due to the language database have stored a plurality of key character set corresponding to the words, the key character sets is the key character information corresponding to the alphabetic character sets of the words. The user key character set is compared with the key character set of each of the words in the language database. The words matching the user key character set is obtained from the language database. This step includes but not limited to the following two cases.

The first case: according to the match result of step S3 and the grammar rule, delete all or part of the suffix key character set at the end of the user key character set, and compare the remainder with the key character sets of the words in the language database. If any word is as same as the remainder, obtain it.

For example, if the user key character set is 967546, the alphabetic character set corresponding to the user key character set is "workin", and the key character set of the word corresponding to the word "work" stored in the language database is 9675. Because the user key character set 967546 includes a part "46" of the characters of the suffix key character set 464, the match result in step S3 is the user key character set 967546 matches the suffix key character set 464. In this step, the part "46" of the characters of the user key character set 967546 should be deleted, and the remainder 9675 is compared with the key character sets of the words stored in the language database. Therefore, the word "work" is obtained.

The second case: according to the match result of step S3 and the grammar rule, delete all or part of the suffix key character set at the end of the user key character set, add one or more key characters to the remainder, and compare the new key character set to the key character sets of the words stored in the language database, so as to obtain one or more match words.

For example, the user key character set is 35464, the alphabetic character set corresponding to the user key character set is "fling", and the key character set of the word corresponding to the word "fly" stored in the language database is 359. Because the user key character set 35464 includes all of the key characters of the suffix key character set 464, the match result in step S3 is the user key character set 35464 matches the suffix key character set 464. In this step, the part "464" of the characters of the user key character set 35464 should be deleted, and a key character "4" should be added to the remainder 35. The new key character set 354 is compared with the key character sets of the words stored in the language database. Therefore, the word "fly" is obtained.

401: according to the match result of step S3, judging whether there is one or more derivative grammar rule arrays matching the user key character set. If the judge result is yes, turn to step 403. If the judge result is no, turn to step 402.

402: finishing the process.

403: taking out a word from the words obtained in step 400, and obtaining the part of speech of the obtained word.

404: taking out an array from the derivative grammar rule arrays obtained in step S3, and matching the word taken out in step 403 with the condition array of the array of derivative grammar rule. If the condition array of the derivative grammar rule array has no second alphabetic character set and the part of speech of the word is the same to that of the condition array, the word meets the requirement of the condition array, i.e. the word matches the array of derivative grammar rule. If the part of speech of the word is different from that of the condition array, the word does not match the array of derivative grammar rule. In the case that the condition array of the array of derivative grammar rule includes a second alphabetic character set, the characters at the end of the word is compared with the second alphabetic character set. If the word includes an alphabetic character set of the second alphabetic character set at the end thereof and the part of speech of the word is as same as that of the condition array, then the word meets the requirement of the condition array, i.e. the word matches the array of derivative grammar rule. Otherwise, the word does not match the array of derivative grammar rule.

405: according to the match result of step 404, judging whether the word matches the array of derivative grammar rule. If the judge result is yes, turn to step 406. If the judge result is no, turn to step 407.

Figure 7:
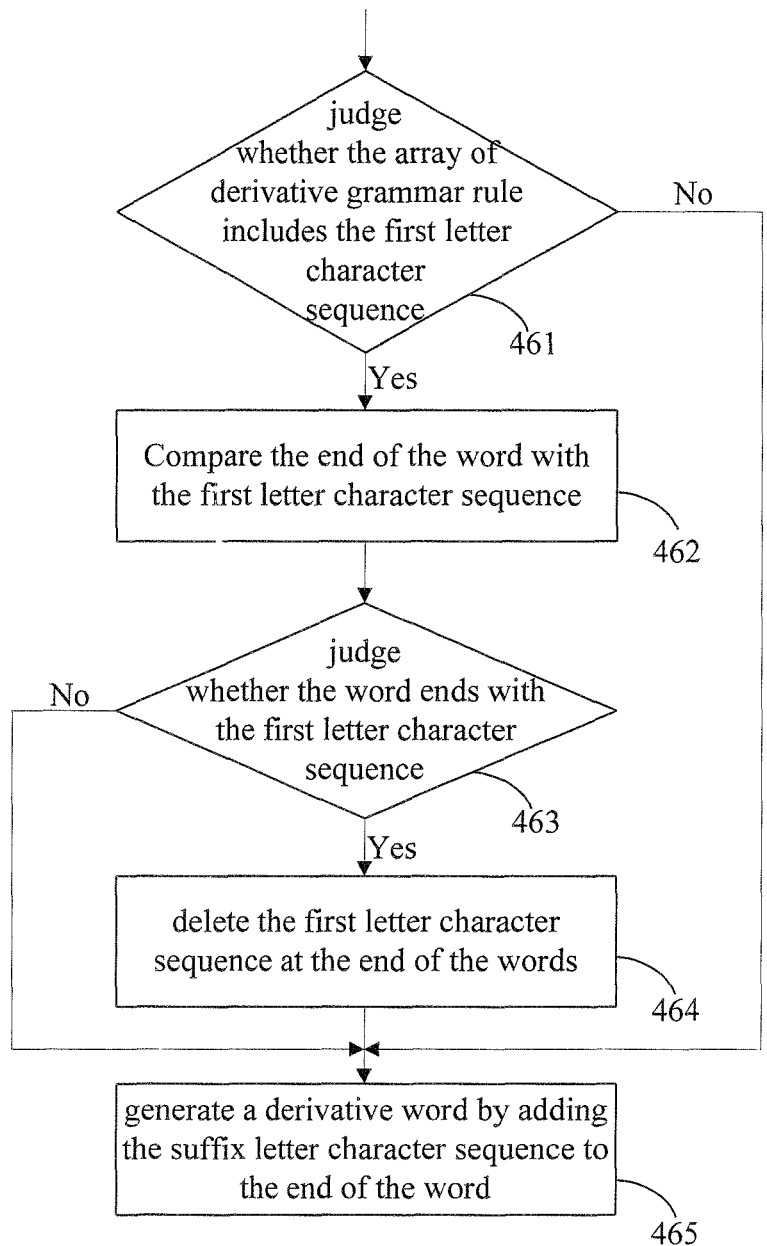
FIG. 7 is a flowchart of a preferred embodiment of step S406 of the method in accordance with the present invention.

406: adding the suffix alphabetic character set of the array of derivative grammar rule including the condition array matching the obtained word to the end of the obtained word, so as to generate a derivative word. Referring particularly to FIG. 7, this step further includes the following steps:

461: judging whether the array of derivative grammar rule includes a first alphabetic character set If the judge result is yes, turn to step 462. If the judge result is no, turn to step 465.

462: comparing the characters at the end of the word with the first alphabetic character set in an order from back to front.

463: judging whether the word is ended with the first alphabetic character set of the array of derivative grammar rule. If the judge result is yes, turn to step 464. If the judge result is no, turn to step 465.

464: deleting the alphabetic character set which is the same to the first alphabetic character set at the end of the word.

465: adding the suffix alphabetic character set included in the array of derivative grammar rule to the end of the word, so as to generate a derivative word.

407: judging whether the word has been matched with all of the derivative grammar arrays obtained in step S4, If the judge result is yes, turn to step 408. If the judge result is no, return to step 404.

408: judging whether there is any word obtained in step S3 having not been matched. If the judge result is yes, turn to step S5, If the judge result is no, return to step 403.

Step S5: ranking all of the derivative words on the basis of matching degree and using frequency according to priorities, and adding the ranked derivative words according to priorities to candidate items which will be chosen by the user.

Figure 4:
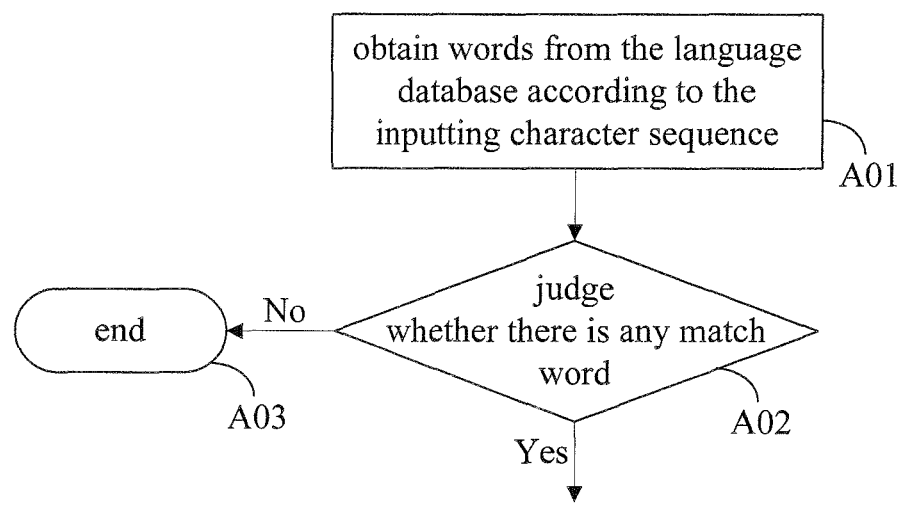
FIG. 4 is a flowchart of step A in the method in accordance with a preferred embodiment of the present invention.

According to an alternative embodiment of the present invention, to simplify procedure, the operation can be set to end immediately when the user inputting character set is wrong. Referring particularly to FIG. 4, the method in accordance with one alternative embodiment of the present invention further includes a step A between step S2 and S3. Step A includes steps as following:

A01: searching the language database to find the words matching the user character set of step S2, wherein the user character set can be a user key character set or a user alphabetic character set.

A02: judging whether the language database includes some words matching the user character set in accordance with the searching result in step A01. If the judge result is yes, turn to step S3. If the judge result is no, turn to step A03.

A03: finishing the process.

Figure 5:
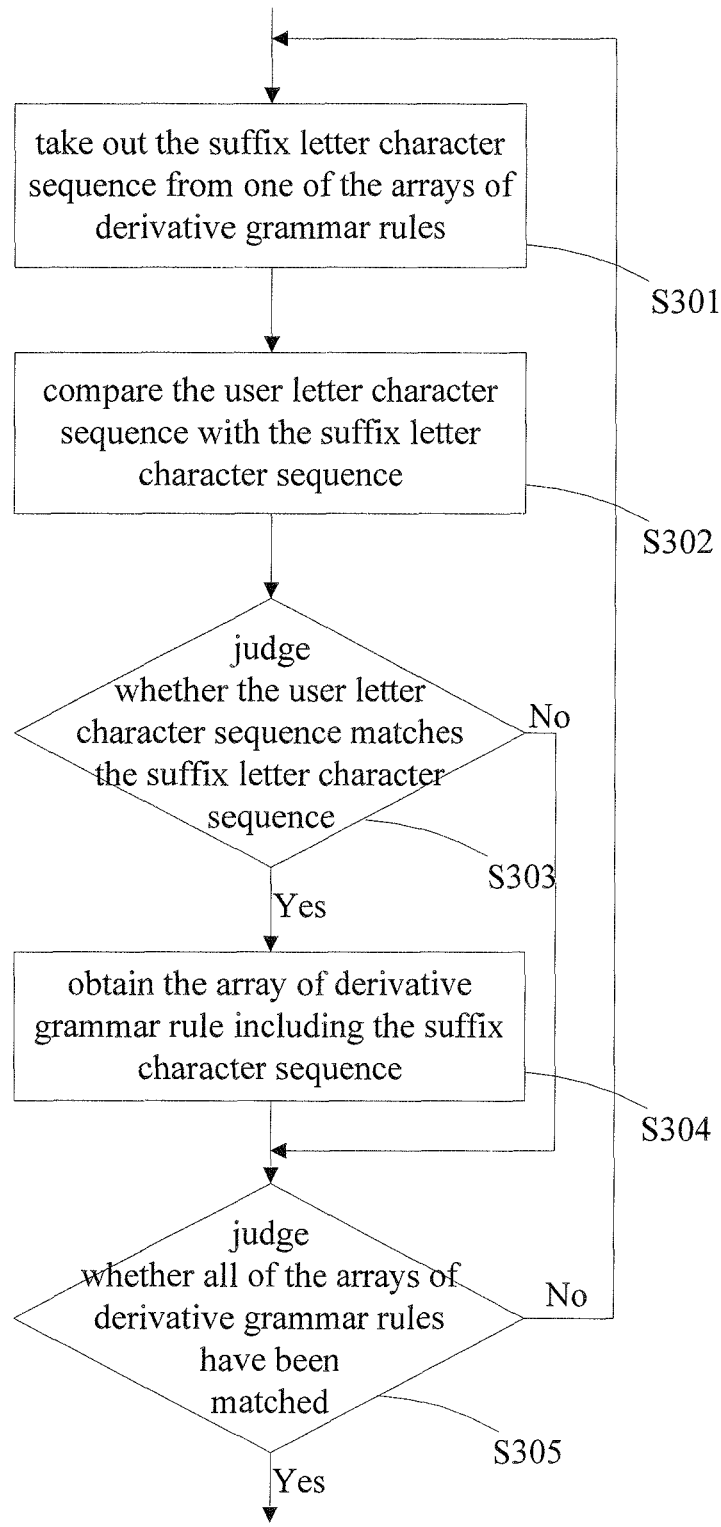
FIG. 5 is a flowchart of another preferred embodiment of step S3 as shown in FIG. 1.

According to yet another alternative embodiment of the present invention, step S3 can further includes a step of matching a user alphabetic character set with the suffix alphabetic character sets of the derivative grammar rule arrays. The user alphabetic character set could be a user alphabetic character set inputted via writing on a handwritten input device in step S2, or a user alphabetic character set converted from a user key character set inputted by a key input device in step S2 according to the function definition of the keys. Derivative grammar rule arrays corresponding to the user alphabetic character set are obtained by matching. Referring specifically to FIG. 5, this step further includes the following steps:

S301: taking out a suffix alphabetic character set from one of the derivative grammar rule arrays.

S302: comparing the user alphabetic character set with the suffix alphabetic character set which has been taken out in step S301 via matching each character in an order from right to left. If the user alphabetic character set includes all of the key characters of the suffix alphabetic character set in an order from the end to the front of the user alphabetic character set, the user alphabetic character set completely matches the suffix alphabetic character set. If the user alphabetic character set includes part of the alphabetic characters of the suffix character set in an order from the end of the user alphabetic character set to the front, the user alphabetic character set partly matches the suffix alphabetic character set. Otherwise, the user alphabetic character set does not match the suffix alphabetic character set.

For example, if the user alphabetic character set is "working" and the suffix alphabetic character set is "ing". The alphabetic character set "working" is compared with the suffix alphabetic character set "ing". Because the alphabetic character set "working" includes all of the key characters of the suffix alphabetic character set "ing" in sequence, the alphabetic character set "working" completely matches the suffix alphabetic character set "ing".

For example, if the user alphabetic character set is "workin" and the suffix alphabetic character set is "ing", the alphabetic character set "workin" is compared with the suffix alphabetic character set "ing". Because the alphabetic character set "workin" includes the alphabetic character set "in" in sequence, the alphabetic character set "workin" partly matches the suffix alphabetic character set "ing".

For example, if the user alphabetic character set is "workk" and the suffix alphabetic character set is "ing", the alphabetic character set "workk" is compared with the suffix alphabetic character set "ing". The alphabetic character set "workk" does not match the suffix alphabetic character set "ing".

For example, if the user alphabetic character set is "workign" and the suffix alphabetic character set is "ing", the alphabetic character set "workign" is compared with the suffix alphabetic character set "ing". The alphabetic character set "workign" does not match the suffix alphabetic character set "ing".

S303: according to the comparison result of step S302, judging whether the user alphabetic character set matches the suffix alphabetic character set. If the user alphabetic character set completely or partly matches the suffix alphabetic character set, turn to step S304. If the user alphabetic character set does not match the suffix alphabetic character set, turn to step S305.

S304: obtaining the suffix character set matching the user alphabetic character set from step S303 and obtaining array of derivative grammar rule including the suffix character set.

S305: judging whether the user alphabetic character set has been matched with the suffix alphabetic character sets of all the derivative grammar rule arrays. If the judge result is yes, turn to step S4. If the judge result is no, turn to step S301.

Figure 6:
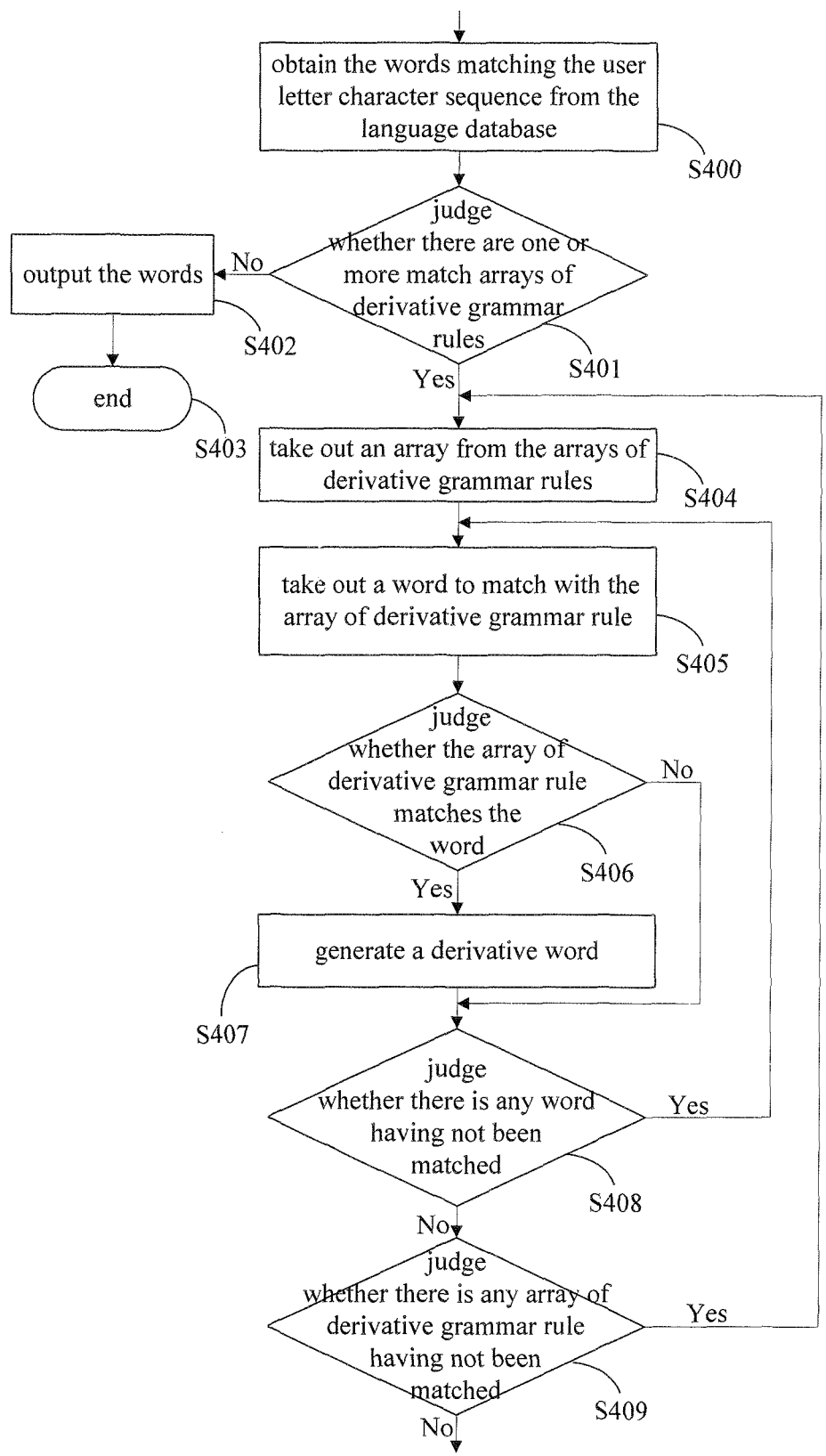
FIG. 6 is a flowchart of another preferred embodiment of step S4 as shown in FIG. 1.

According to an alternative embodiment of the present invention, the user key character set inputted in step S2 can be converted to user alphabetic character according to the function definition of the keys. In this case, step S4 also can be carried out as following. Obviously, even though the user key character set of step S2 is inputted by a handwritten input device, the step S4 still can be carried out in the same manner. Referring particularly to FIG. 7, this step further includes the following steps:

Referring also to FIG. 6, the step further including the following steps:

S400: obtaining the words matching the user alphabetic character set from the language database. This step includes but is not limited to the two following cases:

The first case: delete all or part of the suffix alphabetic character set at the end of the user alphabetic character set according to the match result of step S3, and the grammar rule and compare the remainder with the alphabetic character sets of the words stored in the language database. If any word is the same to the remainder, obtain it.

The second case: according to the match result of step S3 and the grammar rule, delete all or part of the suffix alphabetic character set at the end of the user alphabetic character set, add one or more alphabetic characters to the remainder, and compare the new alphabetic character set with the alphabetic character sets of the words stored in the language database, so as to obtain one or more matching words.

S401: according to the match result of step S3, judging whether there are one or more match derivative grammar rule arrays. If the judge result is yes, turn to step S404. If the judge result is no, turn to step S402.

S402: outputting the match words obtained in step S400.

S403: ending the process.

S404: taking out an array from the derivative grammar rule arrays as obtained in step S3, and obtaining the condition array of the derivative grammar rule array.

S405: taking out a word from the words obtained in step S400 and obtaining the part of speech of the word as obtained, matching the condition array of the array of derivative grammar rule obtained in step S404 with the word which has been taken out. The matching process has no difference from that of the step 404 in the embodiment as previously described in detail and, consequently, will not be described in detail here any more.

S406: judging whether the condition array matches the word according to the match result of step S405. If the judge result is yes, turn to step S407. If the judge result is no, turn to step S408.

S407: adding the suffix alphabetic character set of the derivative grammar rule array to the end of the obtained word to generate a derivative word. The details of the step can particularly refer to FIG. 8 and corresponding description as detailed in the above embodiment and, therefore, will not be described in detail any more.

S408: judging whether the derivative grammar rule arrays taken out from step S404 have been matched with all of the words obtained in S400. If the judge result is yes, return to step S405. If the judge result is no, turn to step S409.

S409: judging whether there is any array of derivative grammar rule obtained in step S3 has not been matched. If the judge result is yes, return to step S404. If the judge result is no, turn to step S410.

S410: outputting the derivative words generated.

Figure 9:
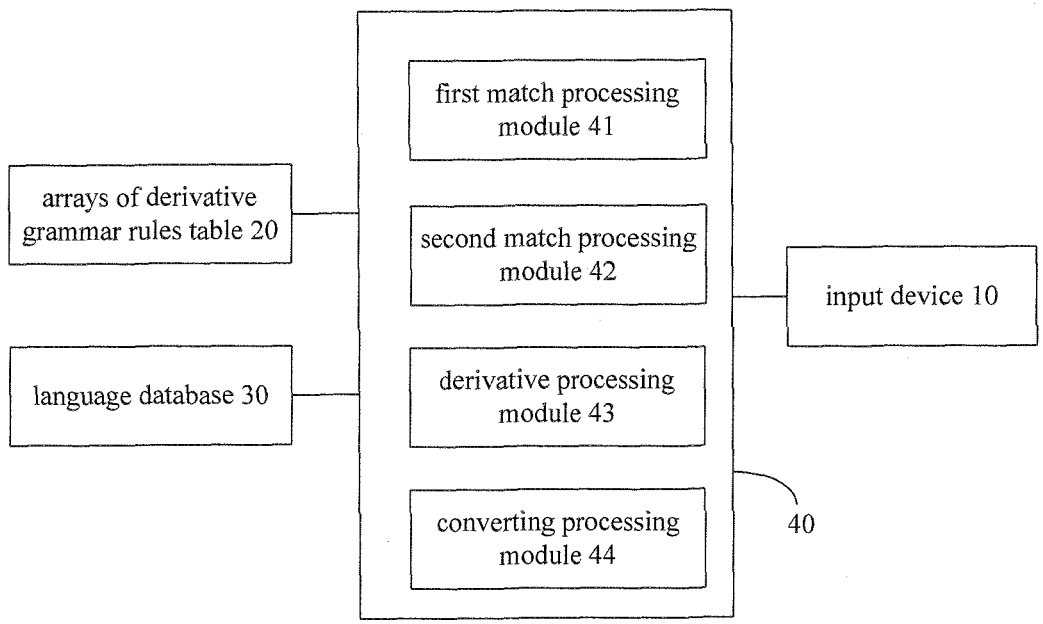
FIG. 9 is a schematic block diagram of the system for generating derivative words in accordance with a preferred embodiment of the present invention.

The system for generating derivative words in accordance with a preferred embodiment of the present invention will now be described in detail with reference to FIGS. 8 to 11. Referring particularly to FIG. 9, the system for generating derivative words in accordance with the preferred embodiment of the present invention includes an input device 10, a storage 20 used for storing derivative grammar rule arrays, a language database 30 and a processor 40.

Referring to FIG. 8, the input device 10 is a number keyboard. The keyboard includes ten number keys 0 to 9. According to the function definition of each key, the key character inputted by each key corresponds to an alphabetic character set. The keyboard is used for inputting user key character sets.

The language database 30 is used for storing words and the part of speech of each word.

The storage 20 for storing derivative grammar rule arrays stores a plurality of arrays of derivative grammar rule. Each of the derivative grammar rule arrays includes a suffix alphabetic character set, a suffix key character set corresponding to the suffix alphabetic character set, a condition array as well as a first alphabetic character set. The condition array includes a part of speech of the base words required by corresponding suffix alphabetic character set and a second alphabetic character set. The suffix key character set is a key character set corresponding to the suffix alphabetic character set. The first alphabetic character set is a alphabetic character set which will be deleted from the ends of the base words when the derivative words are generated as required by corresponding suffix alphabetic character set in accordance with the grammar rules, while the second alphabetic character set is one or more alphabetic character sets at the ends of the base words as required by the corresponding suffix alphabetic character set according to the grammar rules.

The processor 40 has a first match processing module 41, a second match processing module 42, a derivative processing module 43, and a converting processing module 44.

The first match processing module 41 is used for comparing the user key character set inputted by the input device 10 with the suffix key character set of each array of derivative grammar rule in the storage 20 for storing derivative grammar rule arrays in an order from back to front. If the user key character set includes all of the key characters of the suffix key character set in an order from the end of the user key character set to the front, the suffix key character set completely matches the user key character set, i.e. the user key character set matches the array of derivative grammar rule including the suffix key character set. If the user key character set includes part of the key characters of the suffix key character set in an order from the end of the user key character set to the front, the suffix key character set partly matches the user key character set, i.e. the user key character set matches the array of derivative grammar rule including the suffix key character set Otherwise, the user key character set does not match the array of derivative grammar rule including the suffix key character set. The first match processing module 41 can obtain the derivative grammar rule arrays matching the user key character set by comparison.

The converting processing module 44 is used to convert a user key character set to a corresponding user alphabetic character set according to the function definition of the keys, The second match processing module 42 is used for obtaining words matching the user alphabetic character set and the derivative grammar arrays obtained by the first match processing module 41 from the language database 30.

Figure 10:
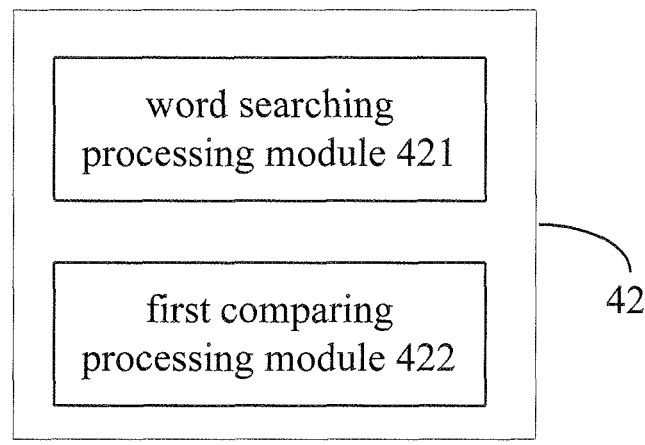
FIG. 10 is a schematic block diagram of a second match processing module for use in the system according to a preferred embodiment of the present invention.

Referring to FIG. 10, the second match processing module 42 includes a word searching processing module 421 and a first comparing processing module 422. The word searching processing module 421 is used to search the language database 30 according to the user alphabetic character set for obtaining words matching the user alphabetic character set and the part of speeches of the obtained words. The words can be obtained in but is not limited to the following two manners.

The first manner: according to the match result of the first match processing module 41 and the grammar rule, the second match processing module 42 deletes all or part of the alphabetic characters of the suffix alphabetic character set at the end of the user alphabetic character set. The remainder of the user alphabetic character set is compared with the alphabetic character sets of the words stored in the language database. If any word is as same as the remainder, obtain it.

The second manner: according to the match result of the first match processing module 41 and the grammar rule, the second match processing module 42 deletes all or part of the alphabetic characters of the suffix alphabetic character set at the end of the user alphabetic character set. One or more alphabetic characters are added to the remainder of the user alphabetic character set. The new alphabetic character set is then compared with the alphabetic character sets of the words stored in the language database. Therefore, one or more match words are obtained.

The first comparing processing module 422 matches the words obtained by the searching processing module 421 with the condition array of each array of derivative grammar rule obtained by the first match processing module 41 and obtains the words which meet the requirement of each condition array. In other words, the first comparing processing module 422 obtains the words matching each of the derivative grammar arrays. Specifically, if the condition array of one array of derivative grammar rule has no second alphabetic character set, the first comparing processing module 422 compares the part of speech of each word obtained by the searching processing module 421 with that of the condition array of each array of derivative grammar rule. If the two parts of speeches are the same, the word meets the requirement of the condition array, i.e. the word matches the derivative grammar rule array including the condition array. If the two parts of speeches are different, the word does not match the derivative grammar rule array. If the condition array of one derivative grammar rule array includes a second alphabetic character set, the first comparing processing module 422 compares the part of speech of each word obtained via the searching processing module 421 with that of the condition array of each array of derivative grammar rule, and compares the alphabetic characters at the end of each word with the second alphabetic character set. If the word includes the second alphabetic character set at its end and the part of speech of the word is the same as that in the derivative grammar rule array, then the word meets the requirement of the condition array, i.e. the word matches the array of derivative grammar rule including the condition array therein. Otherwise, the word does not match the array of derivative grammar rule.

Figure 11:
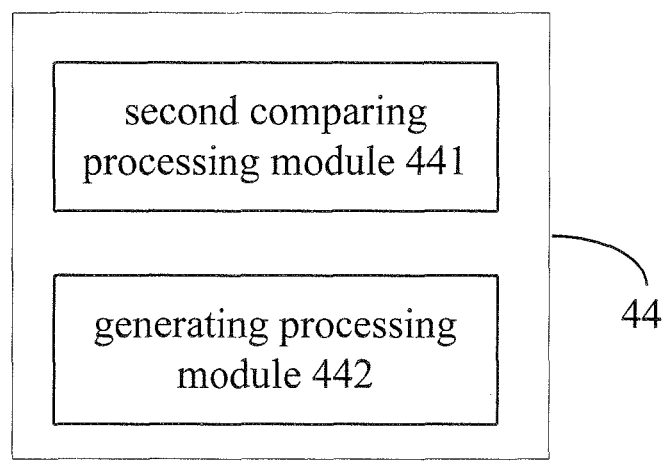
FIG. 11 is a schematic block diagram of a derivative processing module for use in the system in accordance with a preferred embodiment of the present invention.

The derivative processing module 43 is used for generating derivative words according to the words obtained by the second match processing module 42 and the derivative grammar arrays matching the words. Referring particularly to FIG. 11, the derivative processing module 43 includes a second comparing processing module 431 and a generating processing module 432. If one array of the derivative grammar arrays obtained by the first match processing module 41 has no first alphabetic character set, the generating processing module 432 adds the suffix alphabetic character set of the derivative grammar rule array to the ends of the words to generate derivative words. If one array of the derivative grammar arrays obtained by the first match processing module 41 has a first alphabetic character set, then the second comparing processing module 431 compares the ends of the words obtained by the second match processing module 42 with the first alphabetic character set of the array of derivative grammar rule. If one of the words does not end with the first alphabetic character set, the generating processing module 432 adds the suffix alphabetic character set of the array of derivative grammar rule to the end of the word to generate a derivative word. If one of the words ends with the first alphabetic character set, the generating processing module 432 deletes the first alphabetic character set from the end of the word and adds the suffix alphabetic character set of the array of derivative grammar rule to the end of remainder of the word, so as to generate a derivative word.

In accordance with one alternative embodiment of the system of the present invention, the input device is a handwritten input device. The handwritten input device is used for inputting user alphabetic character set into the processor 40.

According to yet another embodiment of the system for generating derivative words of the present invention, the first match processing module can obtain the match derivative grammar arrays by comparing the user alphabetic character set with the suffix alphabetic character set of each array of derivative grammar rule. In this case, the input device of the system may be a handwritten input device used for inputting user alphabetic character sets or a key input device used for inputting user key character sets. In accordance with the function definition of the keys, the user key character sets can be converted to user alphabetic character sets by a converting processing module.

If the user alphabetic character set includes all of the alphabetic characters of the suffix alphabetic character set in an order from the end to the front of the user alphabetic character set, the user alphabetic character set completely matches the suffix alphabetic character set. In other words, the user alphabetic character set matches the array of derivative grammar rule including the suffix alphabetic character set. If the user alphabetic character set only includes part of the alphabetic characters of the suffix alphabetic character set in an order from the end to the front of the user alphabetic character set, the user alphabetic character set partly matches the suffix alphabetic character set, i.e. the user alphabetic character set matches the derivative grammar rule array including the suffix alphabetic character set. Otherwise, the user alphabetic character set does not match the array of derivative grammar rule.

In accordance with other embodiments of the present invention, the language database stores a plurality of key character set corresponding to the alphabetic character set of each word. The word searching processing module may compare the user key character set with the key character sets stored in the language database, and obtain the words matching the user key character set.

It should be noted that other languages in Latin language family can generate derivative words in a manner similar to that of English, the concept and spirit of the present invention is also applicable to all of the languages in Latin language family, such as French, German and Turkish. In view of the foregoing description of the embodiments of the present invention, one ordinary skilled in the art can generate derivative words of the other languages in Latin language family easily.

While the present invention has been illustrated by the above description of the preferred embodiments thereof, while the preferred embodiments have been described in considerable detail, it is not intended to restrict or in any way limit the scope of the appended claims to such details. Other advantages and modifications within the spirit and scope of the present invention will readily appear to those skilled in the art. Therefore, the present invention is not limited to the specific details and the illustrative examples shown and described.

What is claimed is:

1. A system for generating derivative words, the system comprising:
an input device used for inputting user character sets;
a storage for storing a plurality of derivative grammar arrays, a plurality of derivative grammar arrays are stored in the storage, each derivative grammar rule array comprising a suffix alphabetic character set and a condition array corresponding to the base words, the condition array comprising a part of speech corresponding to that of the base word as required by the suffix alphabetic character set;

a first match processing module, used for matching the user character set with each of derivative grammar rule arrays, and obtaining the derivative grammar arrays matching the character information;

a second match processing module, used to obtain words from the language database in accordance with the user character set, the obtained words meeting the requirement of the condition array in one of the derivative grammar arrays as obtained in the first match processing module;

a derivative processing module, used for adding suffix alphabetic character sets behind the obtained words to generate derivative words, the suffix alphabetic character sets being taken from the derivative grammar arrays having the condition arrays met by the words; and a language database, used for storing words;

wherein the input device is a key input device, the inputting character information is a user key character set; and the second match processing module further comprises:

a word searching processing module, used for obtaining words matching the user key character set inputted by the key input device from the language database; and a first comparing processing module, used for comparing the part of speech of each of the words obtained by the searching processing module with that of each of the derivative grammar arrays obtained by the first match processing module, and obtaining all of the words having the same part of speeches.

2. A system for generating derivative words, the system comprising:

an input device used for inputting user character sets;

a storage for storing a plurality of derivative grammar arrays, a plurality of derivative grammar arrays are stored in the storage, each derivative grammar rule array comprising a suffix alphabetic character set and a condition array corresponding to the base words, the condition array comprising a part of speech corresponding to that of the base word as required by the suffix alphabetic character set;

a first match processing module, used for matching the user character set with each of derivative grammar rule arrays, and obtaining the derivative grammar arrays matching the character information;

a second match processing module used to obtain words from the language database in accordance with the user character set, the obtained words meeting the requirement of the condition array in one of the derivative grammar arrays as obtained in the first match processing module;

a derivative processing module, used for adding suffix alphabetic character sets behind the obtained words to generate derivative words, the suffix alphabetic character sets being taken from the derivative grammar arrays having the condition arrays met by the words; and a language database, used for storing words;

wherein the system further comprises a converting processing module used for converting the user key character sets to user alphabetic character sets according to the function definition of the keys;

the input device is a key input device, and the inputting character information is a user key character set; and the second match processing module further comprises:

a word searching processing module, used for obtaining words matching the user alphabetic character set converted by the converting processing module from the language database; and a first comparing processing module, used for comparing the part of speech of each of the words obtained by the searching processing module with that of each of the derivative grammar arrays obtained by the first match processing module, and obtaining all of the words having same part of speeches.

3. A system for generating derivative words, the system comprising:

an input device used for inputting user character sets;

a storage for storing a plurality of derivative grammar arrays, a plurality of derivative grammar arrays are stored in the storage, each derivative grammar rule array comprising a suffix alphabetic character set and a condition array corresponding to the base words, the condition array comprising a part of speech corresponding to that of the base word as required by the suffix alphabetic character set;

a first match processing module, used for matching the user character set with each of derivative grammar rule arrays, and obtaining the derivative grammar arrays matching the character information:

a second match processing module, used to obtain words from the language database in accordance with the user character set, the obtained words meeting the requirement of the condition array in one of the derivative grammar arrays as obtained in the first match processing module;

a derivative processing module, used for adding suffix alphabetic character sets behind the obtained words to generate derivative words, the suffix alphabetic character sets being taken from the derivative grammar arrays having the condition arrays met by the words; and a language database, used for storing words;

wherein the input device is a handwritten input device, the inputting character information is a user alphabetic character set, and the second match processing module further comprises:

a word searching processing module, used for obtaining words matching the user alphabetic character set inputted by the handwritten input device from the language database; and a first comparing processing module, used for comparing the part of speech of each of the words obtained by the searching processing module with the part of speech in each of the derivative grammar arrays obtained by the first match processing module, and obtaining all of the words having same part of speeches.

* * * * *